(12) United States Patent
Harrison et al.

(10) Patent No.: US 7,731,305 B2
(45) Date of Patent: Jun. 8, 2010

(54) METHOD OF COORDINATING PRESSURE DEMANDS IN AN ELECTRONICALLY CONTROLLED BRAKE SYSTEM

(75) Inventors: Christopher A. Harrison, Shelby Township, MI (US); Thomas Alban, Rochester, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 827 days.

(21) Appl. No.: 11/393,405

(22) Filed: Mar. 30, 2006

(65) Prior Publication Data

US 2007/0236080 A1 Oct. 11, 2007

(51) Int. Cl.
*B60T 8/66* (2006.01)
(52) U.S. Cl. ...................................... 303/167; 303/155
(58) Field of Classification Search ................... 701/70, 701/71; 303/155, 163, 167–170, 172, 173, 303/160, 3, 10, 11, 13, 146, 147
See application file for complete search history.

(56) References Cited

U.S. PATENT DOCUMENTS 6,945,612 B2 * 9/2005 Imamura et al. ............ 303/167

FOREIGN PATENT DOCUMENTS

JP 09104329 A * 4/1997

* cited by examiner

*Primary Examiner*—Melanie Torres Williams

(57) ABSTRACT

In an unstable driving situation of a vehicle with an electronically controlled hydraulic brake system with a front/rear split of brake circuits, for instance during a lane change, the inlet valve of one of the two front wheel brakes may be closed for the ESC in order to raise the pressure in only the other wheel brake of the brake circuit. If then the vehicle runs the risk of tipping over, ARP sets in. The vehicle path needs to be readjusted to reduce lateral forces. The ARP demands a pressure build-up in the curve-outer front wheel brake. The corresponding inlet valve will be opened for the ARP to allow a pressure build-up. However, the ESC may still demand a higher pressure on the initially actuated wheel brake to counter understeering. In this event, the inlet valve of the curve-inner wheel brake, which is under high pressure from the ESC intervention, will remain open to allow a cross-flow of brake fluid from the ESC wheel to the ARP wheel.

6 Claims, 2 Drawing Sheets

METHOD OF COORDINATING PRESSURE DEMANDS IN AN ELECTRONICALLY CONTROLLED BRAKE SYSTEM

BACKGROUND OF THE INVENTION

The present invention relates to a method of coordinating pressure demands within a brake circuit of an electronically controlled hydraulic brake system for an automotive vehicle. Electronically controlled brake systems include an electronic control unit which applies various algorithms to data collected from a variety of sensors detecting vehicle behavior.

Such algorithms include anti-lock brake control, traction control, electronic stability control (ESC), automatic rollover prevention (ARP), and possibly others. While anti-lock braking controls the brake pressure during a driver-operated braking maneuver, traction control, ESC, and ARP are so-called active brake controls, i.e. a pressure generator, e.g. a pump, will generate brake pressure to be applied to individual wheels independent of the driver's brake activation.

Sometimes two of the algorithms, simultaneously or in overlapping time segments, detect an instability in vehicle behavior, e.g. wheel speeds, yaw rate, lateral acceleration, etc., based on different criteria that would trigger different interventions. Thus an arbitration logic will prioritize one algorithm over the other or find a compromise by initiating a control including components of both algorithms.

In highly dynamic situations, i.e. in situations with rapidly changing pressure demands, a quick intervention and real-time performance is of high importance. In order to provide fluid pressure as quickly as possible during active braking operations, it has been suggested to include high-pressure accumulators which are filled by the pump when currently no intervention is required and connected to the brake lines when necessary. Other suggestions include priming pumps and other additional devices.

Any additional piece of hardware, however, will add to the packaging space, to the weight, and to the price of the brake system.

It is therefore an objective of the present invention to take advantage of existing hardware within the brake system to attain a rapid real-time pressure build-up where needed.

SUMMARY OF THE INVENTION

In situations where a prioritized control algorithm demands a fluid pressure build-up in one wheel brake of a brake circuit when a high brake pressure already prevails in the other wheel brake of the same brake circuit, the current invention suggests to take advantage of brake fluid that is already present in the brake circuit. If the electronic control unit decides that, within a brake circuit, one wheel brake needs a pressure increase and the other wheel brake of the same brake circuit is already under high pressure, it will be beneficial to connect the wheel brake presently under high pressure with the wheel brake needing a pressure build-up through the inlet valves, so the pressure fluid can flow across to build up pressure in the other wheel brake more quickly than by means of the pump alone.

At the same time, the pump will supply additional brake fluid to further build up the pressure in the prioritized wheel, while the not prioritized wheel may be shut off from the fluid supply until the pressure demand of the other wheel brake is satisfied. Another option is to continue building up pressure in both wheel brakes if requested.

This strategy can take effect in situations in which, for example, the vehicle is in a highly dynamic driving maneuver that triggers an ESC intervention, which in return may result in a situation that renders the vehicle prone to a rollover. In this case the ARP will be awarded higher priority than the ESC through an arbitration logic carried out within the electronic control unit of the brake system. If the ESC algorithm demands a pressure build-up in one front wheel, but ARP demands a pressure build-up in the other front wheel, the electronic control unit changes its strategy from ESC to ARP to build up pressure in the front wheel brake indicated by ARP.

In a brake system with a front axle/rear axle split of brake circuits, the inlet valve of the wheel brake which is not subject to an ESC pressure demand is closed for the ESC in order only to raise the pressure in the other wheel brake of the brake circuit. If this correction of the vehicle direction results in lateral forces that bear the risk of tipping over, for instance during a lane change or fishhook maneuver, the roll-over protection sets in. The vehicle path needs to be readjusted to reduce the turn radius of the vehicle path in the upcoming turn. To this end, a pressure build-up in the future curve-outer wheel brake of the front axle will be demanded. The corresponding inlet valve will be opened for the ARP to allow a pressure build-up. However, the ESC algorithm still may demand a higher pressure on the curve-inner wheel brake in order to prevent the vehicle from excessive understeering. In this event, the inlet valve of the curve-inner wheel brake, which is under high pressure, will be opened as well—or will remain open—to allow a cross-flow of brake fluid from the curve-inner wheel to the curve-outer wheel and to further allow a pressure build-up in both front wheel brakes. Physically, this is a very sensible approach since braking both front wheels will slow the vehicle down back to a speed at which the current road conditions can be mastered.

The invention will be illustrated in further detail by means of an embodiments shown in the accompanying drawings.

DETAILED DESCRIPTION OF THE DRAWINGS

Figure 1:
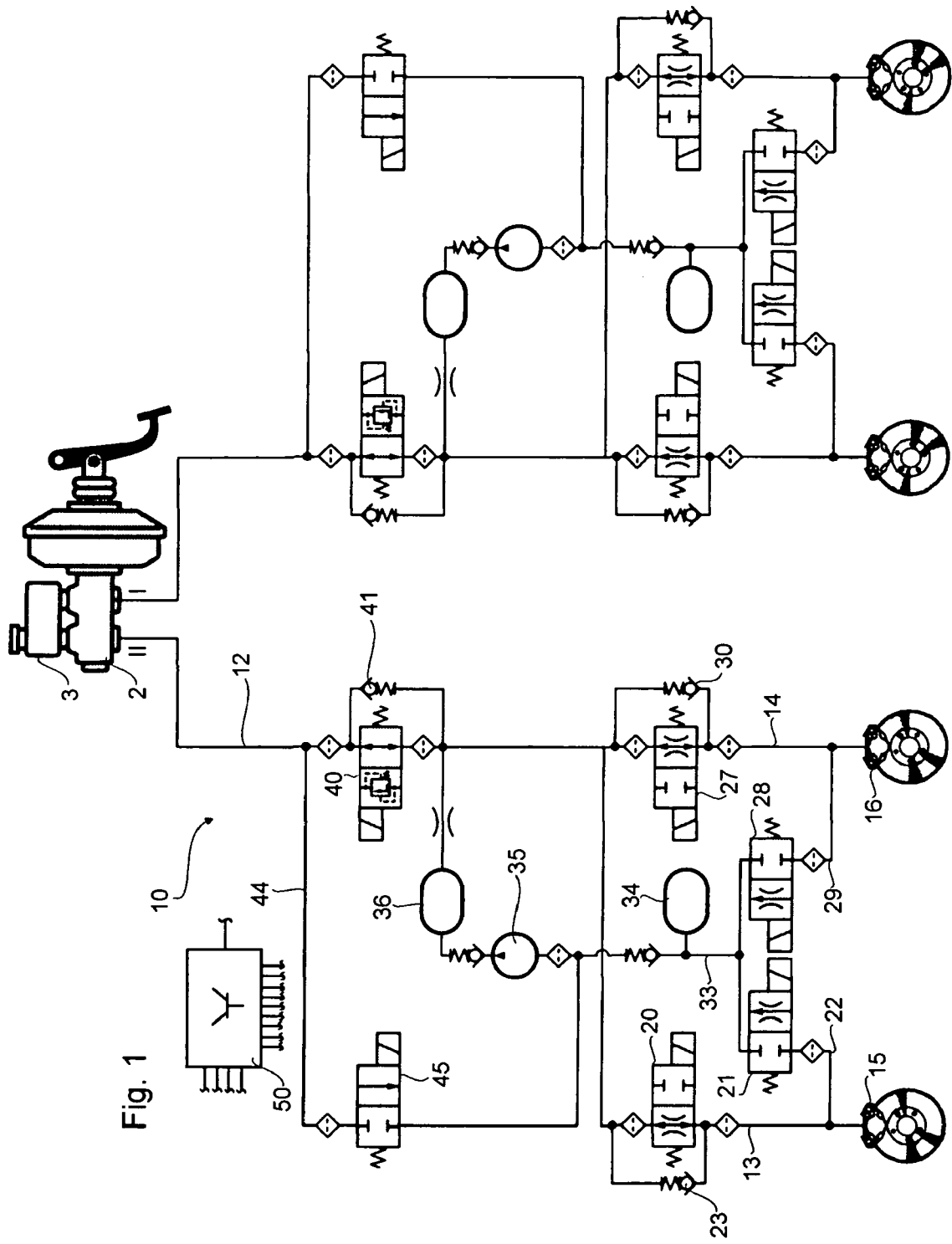
FIG. 1 shows a simple set-up of an electronically controlled hydraulic brake system capable of active braking.

FIG. 1 shows a hydraulic dual-circuit brake system 1 for motor vehicles capable of performing anti-lock brake control as well as active interventions for traction control, ESC, ARP, and the like. The brake system has a pedal-actuable tandem master brake cylinder 2 with a brake fluid reservoir 3.

Both brake circuits of the shown brake system have the same set-up, so that the following description of brake circuit II applies to brake circuit I as well.

The brake line 12 of brake circuit II begins at the master brake cylinder 2 and splits into two inlet lines 13 and 14. Inlet line 13 leads to a wheel brake 15 and inlet line 14 leads to a wheel brake 16 of a driven rear axle of the vehicle.

A valve assembly that comprises an inlet valve 20 disposed in the inlet line 13 and a outlet valve 21 that is located in a return line 22 is associated with the wheel brake 15. The inlet valve 20 has a spring-actuated open position and an electromagnetically switchable blocking position. The outlet valve 21 has a spring-actuated blocking position and an electromagnetically switchable open position. A one-way valve 23 is disposed in the inlet line 13 parallel to the inlet valve 20. The two-position valves 20 and 21 of the valve assembly also serve the purpose of brake pressure modulation; in switching positions and, a brake pressure build-up is possible in the wheel brake 15, while in the switching positions and, pressure holding and in switching positions and pressure reduction in wheel brake 15 are possible.

A valve assembly is likewise associated with the wheel brake 16 and in the same way as the valve assembly associated with wheel brake 15 comprises an inlet valve 27 in the inlet line 14 and a outlet valve 28 in a return line 29. A one-way valve 30 is connected parallel to the inlet valve 27 in the inlet line 14. The two-position valves 27 and 28 of the valve assembly 26 again have the purpose of modulating the brake pressure in the wheel brake 16.

The return lines 22 and 29 originating at the inlet lines 13 and 14 between the two-position valves 20 and 27 and the wheel brakes 15 and 16 are united in a return line 33 that is connected to the brake line 12. A low-pressure accumulator 34 communicates with the return line 33. Essentially disposed downstream of the low-pressure accumulator 34 in the return line 33 are a pump 35, a damper chamber 36 and a bypassable throttle 37. The pump 35, which is embodied as self-aspirating, can be likewise be driven by the drive motor 36.

A shut-off valve 40 with a parallel-connected one-way bypass valve 41 is disposed in the brake line 12 between the master brake cylinder 2 and the connection of the return line 33. The shut-off valve 40 has a spring-actuated open position and an electromagnetically switchable blocking position. In its blocking position, the shut-off valve 40 includes a pressure limiting function, which prevents excessive pressure build-up in the brake line below the shut-off valve 40.

A bypass line 44 begins at the brake line 12 between the master brake cylinder 2 and the shut-off valve 40. Disposed in the bypass line 44 is a switch-over valve 45 having one spring-actuated or in other words currentless closed position and one electromagnetically switchable open position. The bypass line 44 is connected to the return line 33.

The inlet side of the self-priming pump 35 is connected to the return line 33 and thus to the bypass line 44.

The brake system 1 includes an electronic control unit 50, in which signals from various sensors (not shown) that monitor the rotational behavior of the vehicle can be evaluated. The control unit 50 controls the pump 35 and valves 20, 21, 27, 28, 40, 45 in accordance with a situation-specific control algorithm and, in the event that the demands of two control algorithms are in conflict with each other, arbitrates the demands to find a compromise or to give priority to one of them over the other.

The mode of operation of the brake system is as follows:

In brake circuit II, the valves 20, 21, 27, 28, 40 and 45 assume the position shown prior to onset of braking. The brake pressure generated in the master brake cylinder 2 can now become operative through the brake line 12 and the inlet lines 13 and 14 in the wheel brakes 15 and 16 of the driven rear axle.

If the wheels assigned to the brake circuit develop excessive brake slip and thus are prone to locking up, the control unit 50 initiates the brake pressure modulation at the wheel brakes 15 and 16. To this end, the control unit 50 switches one or both of the two-position valves 20 and 27 in the inlet lines 13 and 14 into the blocking position and switches one or both of the two-position valves 21 and 28 in the return lines 22 and 29 into their open position. At the same time, the control unit 50 starts the pump. In this phase of pressure reduction in at least one of the wheel brakes 15 and 16, pressure fluid can flow through the return line 33 into the low-pressure accumulator 34 or to the self-priming pump 35, which pumps it back into the brake line 12. The phase of pressure reduction is adjoined by phases for pressure holding and pressure build-up in the wheel brakes 15 and 16, until stable rotational behavior of the wheels of the brake circuit is attained. During such an anti-lock control, the shut-off valve 40 may be closed to avoid a pulsing brake pedal. At the end of an anti-lock control operation, the control unit 50 switches the drive motor 36 off, after the evacuation of the low-pressure accumulator 34. All valves return into their currentless positions as shown.

Figure 2:
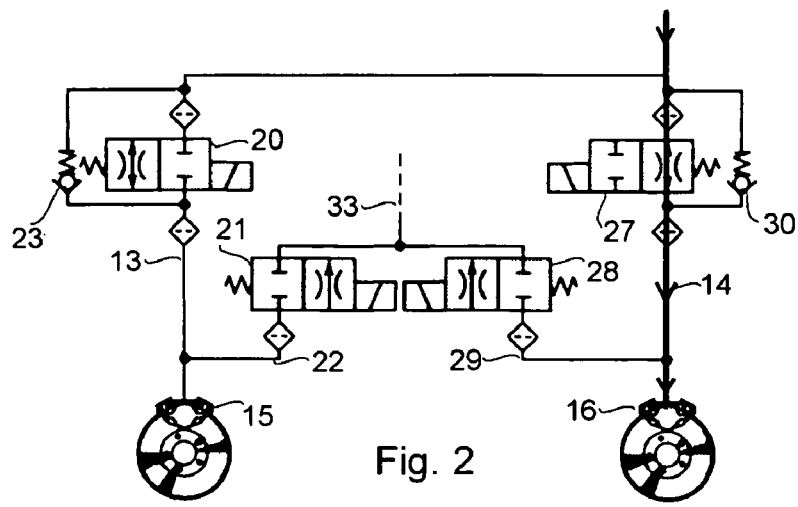
FIG. 2 shows a portion of a brake circuit of such a brake system during pressure-build-up in one wheel brake of the circuit.

If a specific driving situation requires an active brake intervention to slow down a vehicle wheel, for example the wheel associated with wheel brake 16, the control unit 50 switches the shut-off valve 40 in the brake line 12 into the blocking position, the switch-over valve 45 into its open position, and the inlet valve 20 in the inlet line 13 into the closed position. The control unit 50 also switches on the self-priming pump 35, so that it can take in fluid from the pressure fluid reservoir 3 through the unactuated master brake cylinder 2, the brake line 12 and the bypass line 44 and can pump it into the wheel brake 16 through the pressure line 38, the brake line 12 and the inlet line 14. Pressure fluid pumping into the wheel brake 15 does not occur in this process, because the inlet valve 20 assumes its blocking position. This situation is shown in FIG. 2 of the drawings. The flow of fluid is illustrated by bolded fluid lines and arrow heads indicating the direction of fluid flow.

Other brake systems may include a pre-charging device for the pump or an intake line directly connected to the fluid reservoir. Such variations are of no relevance for the current invention.

Figure 3:
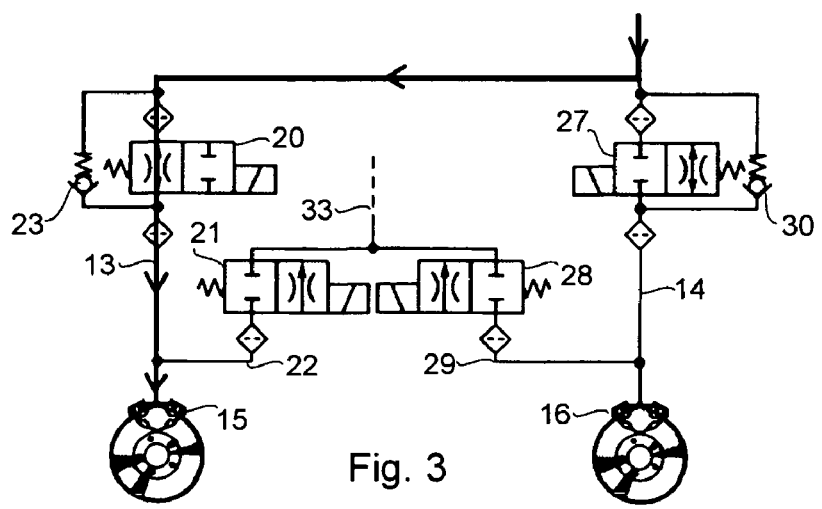
FIG. 3 shows a first possible operation to increase the pressure in one wheel brake after pressure has been built up in the other wheel brake.
Figure 4:
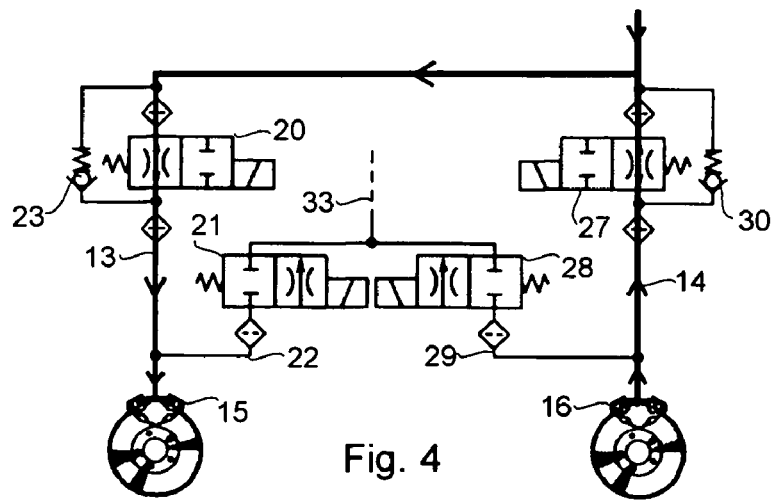
FIG. 4 shows a second possible operation to increase the pressure in one wheel brake after pressure has been built up in the other wheel brake according to the present invention.

In FIGS. 3 and 4 as well, the flow of fluid is illustrated by bolded fluid lines and arrow heads indicating the direction of fluid flow.

Assuming that the brake circuit shown includes the wheel brakes of both front wheels of the vehicle and that the brake pressure build-up in wheel brake 16 according to FIG. 2 resulted from correcting an unwanted behavior of the vehicle, e.g. during a lane change. If then the lateral forces acting upon the vehicle result in the risk of a rollover, the electronic control unit recognizes such a situation and arbitrates the algorithms of the ESC and of the ARP.

There are three possible decisions, depending on the arbitration logic applied in such a situation:

The electronic control unit can allow full pressure build-ups at both front wheels at the same time with no arbitration as to which wheel should have priority—the wheel that is already controlled by the ESC or the other wheel that is supposed to be controlled by the ARP. In this case, the inlet valve 20 will just be opened, regardless of the pressure prevailing in wheel brake 16. However, the limited volume flow from the pump 35 has to supply both front wheel brakes 15 and 16 with pressure fluid, which means that the pressure gradient, i.e. the speed of the pressure build-up, is reduced. The ARP control requires a high pressure gradient to ensure a prevention of a roll over situation, and by reducing the pressure gradient the roll over risk is increased.

This leaves a second option not ever to allow any pressure build-up based on the algorithm of the ESC on the same axle if the ARP is requesting pressure. This approach categorically prioritizes ARP over ESC and corresponds to the valve positions shown in FIG. 3. The inlet valve 27 is closed to block the wheel brake 16 from any further pressure build-up. Instead, inlet valve 20 is opened, and the fluid flows into wheel brake 15 instead. However, this might cause an increase of the under-steering behavior of the vehicle to more than what is necessary to prevent a rollover.

The third and preferred option according to the invention is only to allow a further pressure build-up according to the ESC algorithm when there is no drawback for the ARP. If the wheel pressure in the wheel brake 16 controlled by ESC is higher than the pressure in the other wheel brake 15 and there is not only a pressure increase request from the ARP for wheel brake 15 but also from the ESC for wheel brake 16, then the electronic control unit allows the two position valve 27 to remain open or to be opened, respectively. Thus a cross-flow from wheel brake 16 to wheel brake 15 will occur. This situation is shown in FIG. 4. As soon as equal pressure is reached in both wheel brakes, either the inlet valve 27 can be closed to accelerate the further pressure build-up in wheel brake 15 by means of the pump 35. On the other hand, it may also remain open until the ESC pressure demand is met.

On the other hand, if the pressure in wheel brake 16 is lower than the pressure in wheel brake 15, then no pressure increase in wheel brake 16 will be allowed as long as there is a pressure increase demand for wheel brake 15. The latter situation corresponds to FIG. 3. However, in this event, it will only take place if the pressure in wheel brake 15 is already higher than in wheel brake 16 in contrast to the second option described above, where this occurs whenever ESC and ARP demand a pressure build-up in different wheel brakes.

What is claimed is:

1. A method of coordinating pressure demands within a brake circuit of an electronically controlled hydraulic brake system, the brake circuit comprising a pressure generator feeding a brake line which splits up into two inlet lines, two wheel brakes, each connected to the brake line via one of the inlet lines, an electromagnetically controlled inlet valve in each inlet line, the method comprising the following steps:

determining pressure demands of each wheel brake based on at least one algorithm and, if a pressure increase is demanded in one wheel brake, and the brake pressure in the wheel brake with the pressure increase demand is lower than the brake pressure in the other wheel brake, opening the inlet valves of both wheel brakes for instant cross-flow of brake fluid to the wheel brake with the pressure increase demand.

2. The method according to claim 1, wherein the at least one algorithm includes at least one member of the group consisting of anti-lock braking, traction control, electronic stability control of the vehicle yaw, automatic rollover prevention.

3. The method according to claim 1, wherein the pressure demands of each wheel brake are determined using a plurality of algorithms, the method comprising the additional step of arbitrating the algorithms and, in case of a conflict, determining the pressure demands based on giving priority to one of the algorithms and considering other algorithms based on predefined criteria.

4. The method according to claim 3, wherein the plurality of algorithms comprises at least two members of the group consisting of anti-lock braking, traction control, electronic stability control of the vehicle yaw, automatic rollover prevention.

5. The method according to claim 1, including the step of closing the inlet valve of the other brake once a pressure cross-flow has occurred.

6. The method according to claim 1, including the step of leaving the inlet valve of both wheel brakes open once a pressure cross-flow has occurred to allow a further pressure build-up from the pressure generator.

* * * * *